US009175843B2

(12) United States Patent
Creusen et al.

(10) Patent No.: US 9,175,843 B2
(45) Date of Patent: Nov. 3, 2015

(54) SOLID STATE LIGHTING MODULE WITH IMPROVED HEAT SPREADER

(71) Applicant: KONINKLIJKE PHILIPS N.V., Eindhoven (NL)

(72) Inventors: Martinus Petrus Creusen, Wijlre (NL); Theodoor Cornelis Treurniet, Best (NL); Henricus Marie Peeters, Baarlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/358,914

(22) PCT Filed: Nov. 6, 2012

(86) PCT No.: PCT/IB2012/056177
§ 371 (c)(1),
(2) Date: May 16, 2014

(87) PCT Pub. No.: WO2013/072805
PCT Pub. Date: May 23, 2013

(65) Prior Publication Data
US 2014/0334153 A1    Nov. 13, 2014

Related U.S. Application Data

(60) Provisional application No. 61/560,847, filed on Nov. 17, 2011.

(51) Int. Cl.
*F21V 29/00*    (2015.01)
(Continued)

(52) U.S. Cl.
CPC . *F21V 29/22* (2013.01); *F21K 9/00* (2013.01); *F21K 9/30* (2013.01); *F21V 19/001* (2013.01); *F21V 19/045* (2013.01); *F21V 29/70* (2015.01); *F21V 29/745* (2015.01); *F21V 29/763* (2015.01); *F21Y 2101/02* (2013.01); *F21Y 2105/001* (2013.01)

(58) Field of Classification Search
None
See application file for complete search history.

(56) References Cited

U.S. PATENT DOCUMENTS 5,989,070 A * 11/1999 Al-Turki .................... 439/644
7,901,107 B2 * 3/2011 Van De Ven et al. ........ 362/231
(Continued)

FOREIGN PATENT DOCUMENTS

GB     2203827 A    10/1988
WO  2010146509 A1  12/2010

*Primary Examiner* — Ashok Patel
(74) *Attorney, Agent, or Firm* — Yuliya Mathis

(57) ABSTRACT

A solid state lighting module (102) for attachment to a socket (103) through rotation of the solid state lighting module around an axis of rotation (111). The solid state lighting module (102) comprises at least one solid state light-source (112); a heat spreading member (104) having two surfaces arranged opposite each other and in thermal connection with each other, the first surface (114) being in thermal connection with the solid state light-source (112); and fastening means (109) arranged to co-operate with fastening means (113) comprised in the socket (103) to bring the second surface (115) of the heat spreading member (104) in thermal connection with a heat sink (110) comprised in the socket (103). The second surface (115) of the heat spreading member (104) has a surface topography with at least one peak (119) and at least one valley (120) arranged concentrically in relation to the axis of rotation (111).

10 Claims, 3 Drawing Sheets

(51) Int. Cl.
*F21K 99/00* (2010.01)
*F21V 19/00* (2006.01)
*F21V 19/04* (2006.01)
*F21V 29/70* (2015.01)
*F21V 29/74* (2015.01)
*F21V 29/76* (2015.01)
*F21Y 101/02* (2006.01)
*F21Y 105/00* (2006.01)

(56) References Cited

U.S. PATENT DOCUMENTS

| 2007/0216274 | A1 | 9/2007 | Schultz et al. |
| 2008/0173431 | A1 | 7/2008 | Yang et al. |
| 2009/0315442 | A1 | 12/2009 | Rooymans |
| 2010/0073929 | A1 | 3/2010 | Gingrich, III |
| 2011/0095690 | A1 | 4/2011 | Sagal |

\* cited by examiner

SOLID STATE LIGHTING MODULE WITH IMPROVED HEAT SPREADER

CROSS-REFERENCE TO PRIOR APPLICATIONS

This application is the U.S. National Phase application under 35 U.S.C. §371 of International Application No. PCT/032012/056177, filed on Nov. 6, 2014, which claims the benefit of [e.g., U.S. Provisional Patent Application No. or European Patent Application No.] 61/560,847, filed on Nov. 17, 2011. These applications are hereby incorporated by reference herein.

FIELD OF THE INVENTION

The present invention relates to a solid state lighting module for rotational attachment to a socket and to a socket for receiving such a solid state lighting module.

BACKGROUND OF THE INVENTION

Solid state lighting is used in many different applications in various fields. Light emitting diodes, LEDs, are an example of solid state light-sources commonly used in everyday lighting.

One of the major advantages with solid state light-sources is their long lifespan and that is part of the reason why solid state lighting is increasingly used for illumination. The operational lifetime of LED lamps is approximately 100 000 hours which is 20 times longer than for incandescent lamps. Even if the life expectancy of solid state light-sources is quite long, it is interesting to be able to replace solid state light-sources either due to failure in individual devices or for alternating between different solid state light-sources in order to provide different light output characteristics. Therefore, module systems for solid state lighting are on the market to enable replacement and the possibility of upgrading the solid state light-sources. Such module systems are comprised of a solid state lighting module and a socket. The solid state lighting module may be attached to the socket through rotation.

An important feature of the solid state lighting for rotational attachment is to dissipate heat generated by the solid state light-sources in an efficient way, since heat can reduce the lifespan and the performance of the solid state light-sources.

SUMMARY OF THE INVENTION

It is an object of the present invention to provide improved heat dissipation between the solid state lighting module and the socket for rotational attachment.

According to a first aspect of the invention, this and other objects are achieved by a solid state lighting module for attachment to a socket through rotation of the solid state lighting module around an axis of rotation, the solid state lighting module comprising: at least one solid state light source, a heat spreading member having a first surface and a second surface arranged opposite to each other and in thermal connection with each other, the first surface being in thermal connection with the at least one solid state light-source, and fastening means arranged to co-operate with corresponding fastening means comprised in the socket to bring the second surface of the heat spreading member in thermal connection with a heat sink comprised in the socket, wherein the second surface of the heat spreading member has a surface topography with at least one peak and at least one valley arranged substantially concentrically in relation to the axis of rotation.

In the present context the surface topography should be understood as variations in the surface structure.

The term solid state light-sources should, in the present context, be understood as semi-conductor based light-sources, e.g. light-emitting diodes or laser diodes.

The second surface of the heat spreading member may advantageously be substantially perpendicular to the above-mentioned axis of rotation, around which the solid state lighting module is rotated during attachment to a socket.

The fastening means may be any type of means capable of attachment through rotation. Examples include a bayonet coupling and screw threads.

The present invention is based on the realization that a better heat transfer for the same circumference of the heat spreading member can be achieved by an increase of the contact area between a heat spreading member and a heat sink. This is accomplished by applying a surface variation comprising at least one peak and at least one valley in the heat spreading member which increases the area of the second surface of the heat spreading member and thus enables an increased area of the heat spreading member that thermally contacts the heat sink thereby improving the transfer of heat away from the solid state light sources. The present inventors have further realized that this increased contact area can be achieved for a solid state lighting module for rotational attachment to a socket by providing a concentric surface topography of the heat spreading member in relation to the rotational axis. Surface variations are substantially equal at the same radius around the axis of rotation.

According to one embodiment, the second surface of the heat spreading member has a surface topography with a plurality of peaks and valleys arranged substantially concentrically in relation to said axis of rotation.

The surface variations of the heat spreading member may be sinusoidal.

According to one embodiment, a peak-to-peak amplitude between the peak and the valley of the surface topography of the heat spreading member may be at least 250 μm. If a certain desired increase in contact area is to be achieved, a surface topography with a small peak-to-peak amplitude will require a larger number of peaks and valleys than a surface topography with a large peak-to-peak amplitude. With a smaller number of peaks and valleys (and a greater distance in a direction perpendicular to the rotation axis between neighboring peaks/valleys), the requirements on manufacturing tolerance of the solid state lighting module (and the socket) become less severe. Therefore, a peak-to-peak amplitude between the peak and the valley of the surface topography of the heat spreading member of at least 1 mm may be even more advantageous.

According to various embodiments, furthermore, a distance in a direction perpendicular to the axis of rotation between neighboring peaks and/or valleys may be at least 0.5 mm, whereby an increase in contact area can be achieved with reasonable requirements on manufacturing and positioning tolerances.

Furthermore, the peak(s) and valley(s) may be rounded. Hereby, the requirements on manufacturing tolerances are reduced as compared to the case where the peak(s) and valley(s) have sharp edges. Accordingly, an improved thermal contact between heat spreading member and heat sink can be achieved substantially without requiring potentially costly high precision machining.

The peak(s) and valley(s) may advantageously be rounded with a radius of curvature of at least 0.5 mm.

As was mentioned above, the total increase in contact area between the heat spreading member of the solid state lighting module and the heat sink of the socket will mainly depend on the peak-to-peak amplitude between peaks and valleys and the frequency or density of the peaks and valleys (or the density of the corrugation). Through, for example, a surface topography with a substantially sinusoidal cross-section and a ratio between peak-to-peak amplitude and wavelength of at least 1, the increase in contact area as compared to the case with a flat heat spreading member will be at least about 60% without increasing the space needed for the thermal management.

The solid state lighting module according to various embodiments of the present invention may advantageously be designed so that the heat spreading member comprises several different materials and different configurations. The heat spreading member may be a metallic plate, slab or sheet providing good thermal conductivity for efficient transfer of heat generated by the solid state light source. The heat spreading member may comprise other material such as metal alloys, thermal epoxy, graphite, diamond or other carbon based materials.

A further advantage of using an electrically conductive material such as metal for the heat spreading member is that no additional earth contact between the solid state lighting module and the socket may be needed, which may facilitate the manufacturing, reduce cost or increase robustness.

Macroscopic concentric surface variations of a heat spreading member for rotational attachment, e.g. surface variation over 1 mm peak-to-peak, greatly improve heat transfer by increasing the area of the heat spreading member that will be in thermal contact with the heat sink. Besides the macroscopic surface variations, the surface of the heat spreading member may typically comprise irregularities on the micrometer scale. The irregularities comprise interstitial air which reduces the physical contact between the surfaces and the heat transfer.

According to one embodiment of the present invention, the contact area may be further increased by providing a heat spreading member comprising a metal sheet arranged as a biased spring to flex back towards the solid state lighting module when applying pressure on the heat spreading member.

In one embodiment, the heat spreading member may comprise a metal sheet arranged as a biased spring to flex in a direction towards the solid state light-sources when the heat spreading member is brought into contact with the heat sink upon attachment of the solid state lighting module to the socket.

The metal sheet is in thermal contact with the heat sink in the socket when the spring force of the sheet is overcome by the fastening means. For the metal sheet to substantially conform to the microscopic surface variations of the heat sink, the metal sheet should be sufficiently thin. However, the thermal conductivity will be decreased for a thinner metal sheet. A suitable thickness range will depend on the material selected for the metal sheet. For aluminum, an optimum thickness range for the metal sheet may be 0.1-1.5 mm, and for stainless steel, the optimum thickness range may be 0.05-0.3 mm. For copper, which may also be a suitable choice of material, the optimum thickness range may be 0.05-0.5 mm.

An additional advantage of using a spring-loaded metal sheet is that the metal sheet can adjust and conform to any mismatches between peaks and valley in the surface topography of the heat spreading member and the heat sink.

According to another embodiment, a portion of the heat spreading member facing away from the solid state light-sources may be made of a metal having a hardness below 60 on the Brinell hardness scale.

Examples of such soft metals include, for example, 1000 Series Aluminum or tin, silver or lead. Apart from the solutions with the thermal interface material and the metal sheet the inventors have also realized how to further improve heat dissipation by using a metal with hardness below 60 on the Brinell hardness scale as a part of the heat spreading member adjacent to the second surface. The rotational attachment of the solid state lighting module to the socket effectively deforms the metal so it conforms to the microscopic irregularities in the heat sink.

The rotational attachment contributes to ensure a good thermal contact between the heat spreading member and heat sink. A further advantage with this embodiment is that the rotational attachment may be performed with less effort due to the conformable surface layer of the heat spreading member while it conform so microscopic irregularities of the heat sink to improve heat dissipation.

Further improvements in heat transfer according to one embodiment are that the second surface of the heat spreading member is at least partially covered with a thermal interface material. The thermal interface material may advantageously be provided in the form of a paste allowing the thermal interface to form around surface irregularities such as particle contamination. For example thermal grease can be used to reduce voids of interstitial air between the heat spreading member and the heat sink. Air is not a good thermal conductor and thermal interface material may therefore be used as a complement to improve heat dissipation, because even a smooth surface will comprise small gaps of air on the micrometer scale. A layer of thermal grease can also be arranged to reduce friction during the rotational attachment.

According to one embodiment, the second surface of the heat spreading member may further comprise a liner on the second surface of the heat spreading member arranged to at least partly cover said thermal interface material for reducing friction during attachment of said solid state lighting module with said socket.

The liner may be a plastic material arranged to create a layer with less friction for an easier rotational attachment.

According to a second aspect of the invention there is provided a socket for receiving the solid state lighting module according to any one of the preceding claims, through rotation around an axis of rotation, the socket comprising: a heat sink; and fastening means arranged to co-operate with corresponding fastening means comprised in the solid state lighting module to bring a surface of the heat sink in thermal connection the second surface of the heat spreading member comprised in the solid state lighting module, wherein the surface of the heat sink has a surface topography with at least one peak and at least one valley arranged substantially concentrically in relation to said axis of rotation. The surface variations of the heat spreading member and the heat sink are arranged to complement each other. For example an elevated part in the surface variations of the heat spreading member will correspond to an equally recessed part in the surface variation of the heat sink.

Moreover, the solid state lighting module according to the first aspect of the present invention may advantageously be comprised in a solid state lighting device, wherein the solid state lighting device further comprises a socket for receiving the solid state lighting module through rotation around an axis of rotation and wherein the socket comprises a heat sink and fastening means co-operating with corresponding fastening means comprised in the solid state lighting module and providing a thermal connection between a surface of the heat sink and the second surface of the heat spreading member. The surface topography of the surface of the heat sink is substantially an inverse of the surface topography of the second surface of the heat spreading member. Advantageously the surface of the heat sink may comprise a deformable material which thus provides for the surface of the heat sink to substantially conform to the surface topography of the heat spreading member and hence the surface topography of the surface of the heat sink is substantially an inverse of the surface topography of the second surface of the heat spreading member. Alternatively, the surface topography of the heat spreading member comprises at least one peak and at least one valley arranged substantially concentric in relation to the axis of rotation wherein the peak in the heat spreading member of the solid state lighting module is configured to fit in a corresponding valley in the heat sink of the socket.

It is noted that the invention relates to all possible combinations of features recited in the claims.

BRIEF DESCRIPTION OF THE DRAWINGS

These and other aspects of the present invention will now be described in more detail, with reference to the appended drawings showing example embodiments of the invention, wherein:

FIG. 4b is an enlarged cross-section view illustrating the thermal connection between the heat spreading member comprised in the solid state lighting module and the heat sink comprised in the socket of thermal interface of the heat spreading member and the heat sink for a further embodiment comprising the heat spreading member in FIG. 4a.

DETAILED DESCRIPTION OF AN EXEMPLARY EMBODIMENT OF THE INVENTION

In the following description, the present invention is described with reference to a LED-based light-emitting device in which the LED-module is attached to the socket using bayonet-type fastening means.

It should be noted that this by no means limits the scope of the invention, which is equally applicable to other solid state lighting modules that may, for example, comprise semiconductor lasers. Moreover, the solid state lighting module may be attachable to the socket using other kinds of fastening means, such as a threaded connection.

Figure 1:
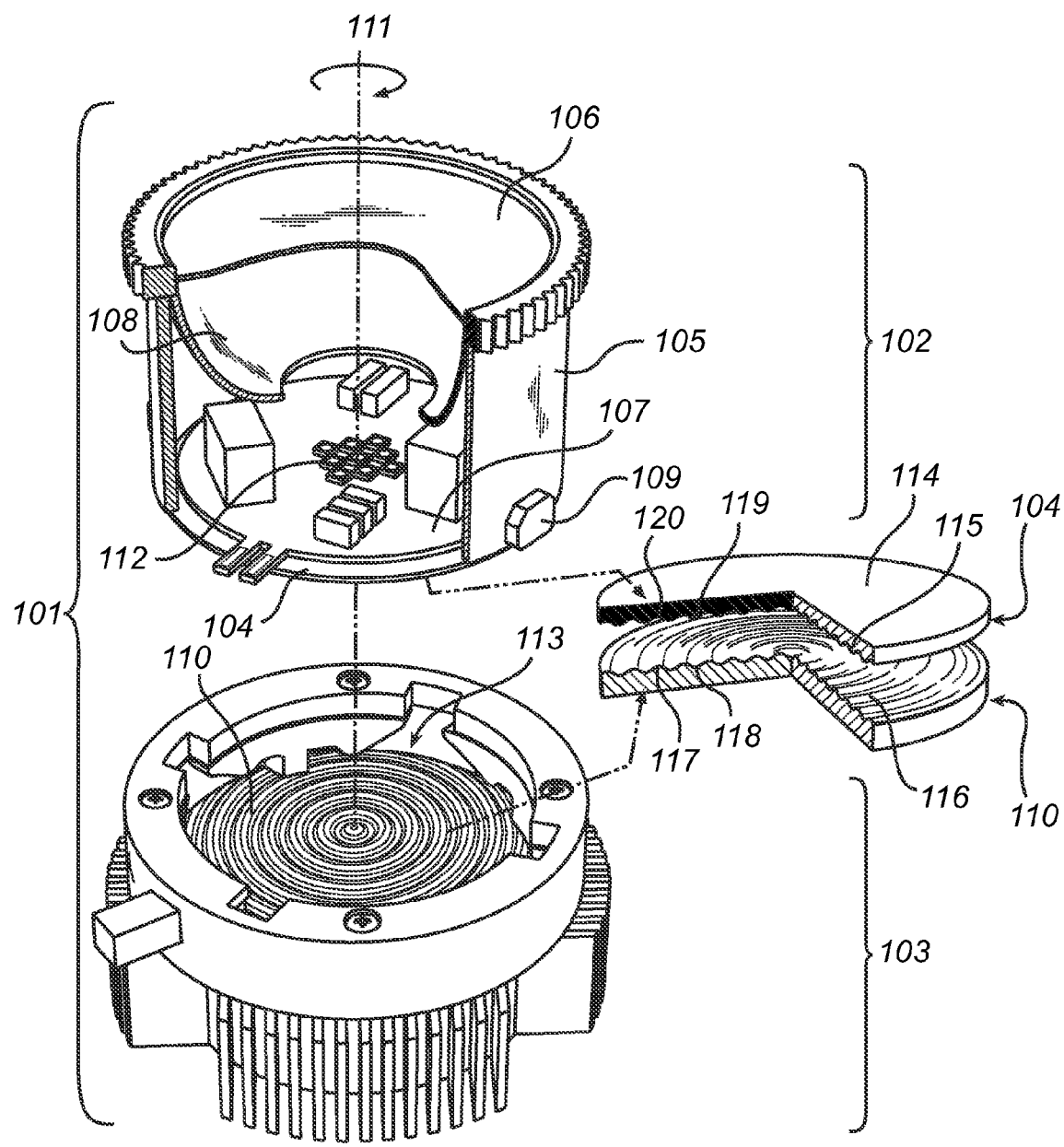
FIG. 1 schematically illustrates a solid state lighting device comprising a solid state lighting module according to an embodiment of the present invention and a socket according to an embodiment of the present invention.

FIG. 1 schematically illustrates a solid state lighting device 101 comprising a solid state lighting module 102 and a socket 103.

The solid state lighting module 102 comprises a printed circuit board 107, a plurality of solid state light-sources, in the form of light-emitting diodes (LEDs) 112, a heat-spreader 104, a substantially cylindrical housing 105, a reflector 108, an optically transmissive top cover 106, and fastening means, here in the form of protrusions or lugs 109. The LEDs 112 are electrically and thermally connected to the printed circuit board 107, which is in turn thermally connected to the heat spreader 104, in order to dissipate heat generated by the LEDs 112 during operation thereof. The cylindrical housing 105 and the top cover 106 are arranged to form a housing enclosing the LEDs 112, and the reflector 108 is arranged inside this housing to collimate the light emitted by the LEDs 112.

The socket 103 comprises a heat sink 110 and fastening means in the form of recesses 113. The solid state lighting module 102 is attached to the socket 103 by axially inserting the lugs 109 of the solid state lighting module 102 in the corresponding recesses 113 of the socket and rotating the solid state lighting module 102 about the axis 111 of rotation as is schematically indicated in FIG. 1. Due to the configuration of the lugs 109 and the recesses 113, the solid state lighting device is then locked to the socket in such a way that the heat spreader 104 is pressed against the heat sink 110. At the same time, the LEDs are connected to electrical power via connection means (not shown in FIG. 1) comprised in the socket 103 for electrically connecting the LEDs 112 of the solid state lighting module 102.

When the heat spreader 104 of the solid state lighting module 102 is pressed against the heat sink 110 of the socket 103, a thermal connection between the heat spreader 104 and the heat sink 110 is achieved. According to various embodiments of the present invention, this thermal connection is improved compared to the prior art by increasing the contact area between the heat spreader 104 and the heat sink 110 through a suitable surface topography of the heat spreader 104 and the heat sink 110.

As is schematically illustrated in FIG. 1, the heat spreader 104 has a first surface 114 facing the LEDs 112, and a second surface 115 facing away from the LEDs 112 (and towards the heat sink 110 when the solid state lighting module is attached to the socket 103). The second surface 114 has a surface topography with a plurality of peaks 119 and valleys 120 arranged substantially concentrically in respect of the axis of rotation 111. This allows for rotational attachment and an increased thermal contact area when the solid state lighting module 102 is attached to a suitable socket 103. Such a socket 103 may have a heat sink that has a surface topography that is substantially the inverse of the surface topography of the heat spreader 104 of the solid state lighting module 102, as is schematically indicated in FIG. 1. In particular, the heat sink 110 of the socket 103 in FIG. 1 comprises a top surface 116 facing the receiving opening of the socket 103. The top surface 116 has a surface topography with a plurality of peaks 117 and valleys 118 that are arranged concentrically in respect of the axis 111 of rotation in an inverse configuration as compared to the peaks 119 and valleys 120 of the heat spreader 104. Alternatively, the heat sink 110 may be made of a material that conforms to the surface topography of the heat spreader 104.

Figure 2:
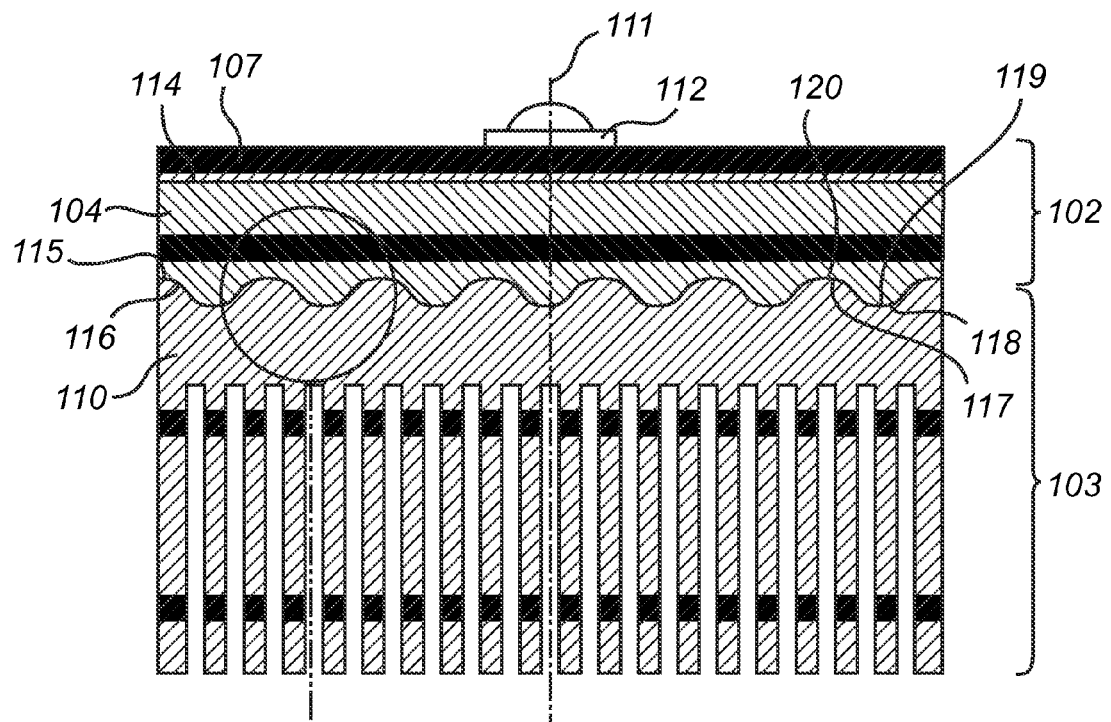
FIG. 2 is a partial cross-section view of the solid state lighting device in FIG. 1 schematically illustrating the thermal connection between the heat spreading member comprised in the solid state lighting module and the heat sink comprised in the socket.

FIG. 2, which is a schematic partial cross-section view of the solid state lighting device 101 in FIG. 1, illustrates the increased thermal contact area that is achieved when the heat spreader 104 of the solid state lighting module 102 is pressed against the heat sink 110 of the socket 103 because of the surface topography with corresponding peaks and valleys of the heat spreader 104.

Various embodiments of the solid state lighting module according to the present invention with different heat spreader configurations will now be described with reference to FIGS. 3a-b and FIGS. 4a-b.

The surface topography with corresponding peaks and valleys of the heat spreader 104 and the heat sink 110 schematically illustrated in FIG. 1 and FIG. 2 increases the thermal contact area as compared to a conventional arrangement with a flat heat spreader pressed against a flat heat sink. A further increase in thermal contact area can be achieved by also handling micro-scale surface variations of the heat spreader 104 and/or the heat sink 110 that otherwise may lead to microscopic air pockets between the heat spreader 104 and the heat sink 110.

Figures 3A, 3B:
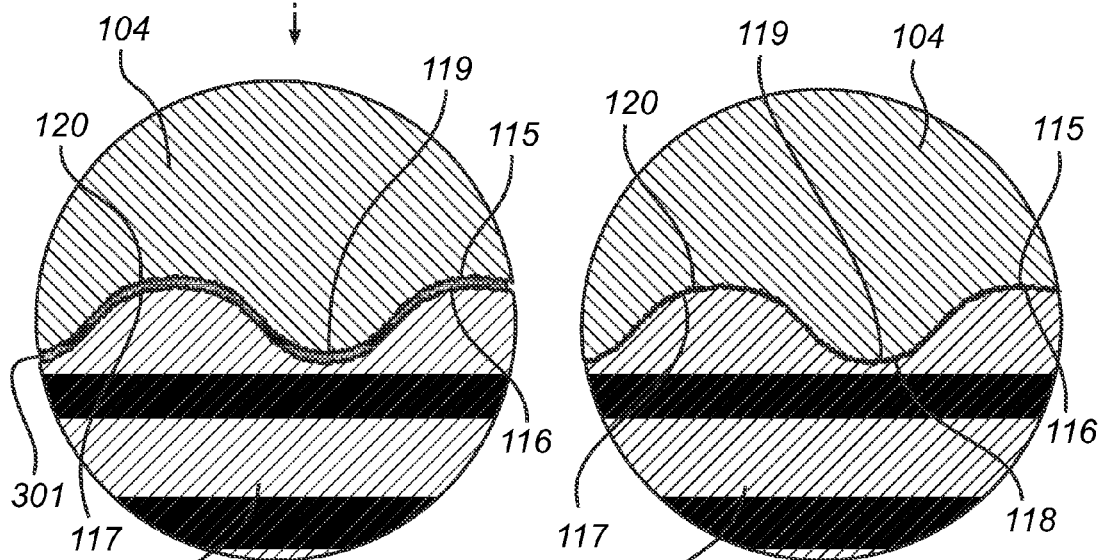
FIGS. 3a-b are enlarged partial cross-section views illustrating the thermal connection between the heat spreading member comprised in the solid state lighting module and the heat sink comprised in the socket of thermal interface of the heat spreading member and the heat sink for two different exemplary embodiments.

According to a first embodiment, schematically illustrated in FIG. 3a, a thermal interface material 301, such as so-called thermal grease may be provided between the heat spreader 104 and the heat sink 110. This will further increase the thermal contact area between the heat spreader 104 and the heat sink 110. So-called thermal grease may, for example, comprise thermally conductive ceramic fillers dispersed in silicone or hydrocarbon oils.

According to a second embodiment, schematically illustrated in FIG. 3b, the heat spreader 104 may comprise a metal that is sufficiently soft to be plastically deformed on a micro scale by the micro variations on the surface 116 of the (harder) heat sink 110 when the solid state lighting module 102 is attached to the socket 103 through rotation. The inventors have found that a metal having a hardness below 60 on the Brinell hardness scale is sufficiently soft to conform to the micro variations of the surface 116 of the heat sink 110 so as to achieve the desired increased thermal contact area.

In particular, the pressure and the friction between the heat spreader 104 and the heat sink 110 resulting from the rotational attachment of the solid state lighting module 102 to the socket 103 forces the metal at the second surface 115 of the heat spreader 104 to conform to the microscopic variations in the surface 116 of the heat sink 110. Examples of suitable metals having a hardness below 60 on the Brinell scale include, for example, pure aluminum, tin, lead and silver. For instance, aluminum from the Al 1000 series can be used for the part of the heat spreading member facing the heat sink 110.

Figure 4A:
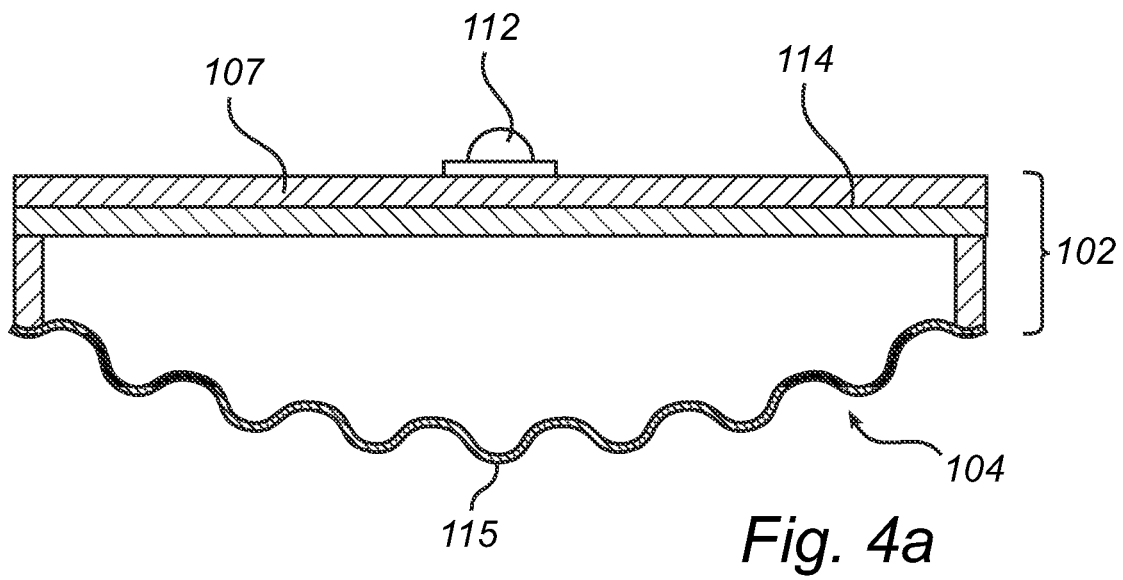
FIG. 4a is a partial schematic cross-section view of another embodiment of the solid state lighting module according to the present invention.
Figure 4B:
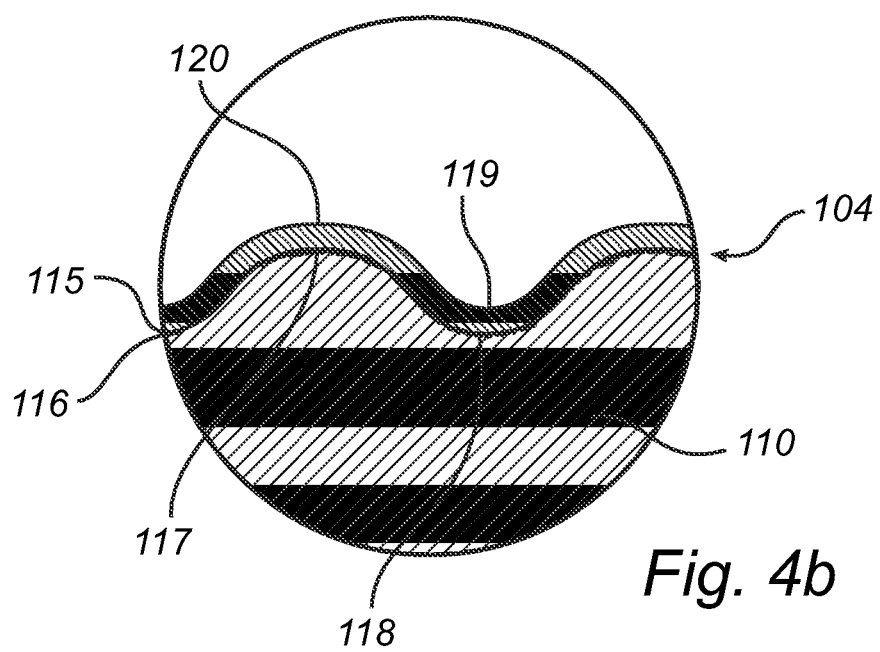

FIGS. 4a-b schematically illustrate a third embodiment of the solid state lighting module 102 according to the present invention. With reference to FIG. 4a, the heat spreader 104 comprises a thin corrugated metal sheet being spring loaded and biased away from the LEDs 112. When the heat spreader 104 is pressed against the heat sink 110, as is schematically illustrated in FIG. 4b, the heat spreader conforms to micro variations in the heat sink 110, whereby the thermal contact area is increased.

Additionally, variations to the disclosed embodiments can be understood and effected by the skilled person in practicing the claimed invention, from a study of the drawings, the disclosure, and the appended claims. For example, the heat sink 110 comprised in the socket may comprise a metal having a hardness of below 60 on the Brinell scale, or a spring loaded thin metal sheet as described above in respect of the heat spreader 104 comprised in the solid state lighting module 102.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A solid state lighting device comprising a solid state lighting module and a socket for receiving the solid state lighting module through rotation around an axis of rotation, said solid state lighting module comprising:
   at least one solid state light-source;
   a heat spreading member having a first surface and a second surface arranged opposite each other and in thermal connection with each other, said first surface being in thermal connection with said at least one solid state light-source,
said socket comprising:
   a heat sink; and
   receiving fastening means co-operating with corresponding extending fastening means comprised in said solid state lighting module and providing a thermal connection between a surface of said heat sink and the second surface of the heat spreading member comprised in said solid state lighting module,
   wherein the second surface of said heat spreading member has a surface topography with a plurality of peaks and valleys arranged substantially concentrically in relation to said axis of rotation and wherein the surface topography of the surface of the heat sink is substantially an inverse of the surface topography of the second surface of the heat spreading member.

2. The solid state lighting device according to claim 1, wherein the surface of the heat sink comprises a deformable material.

3. The solid state lighting module according to claim 1, wherein a distance in a direction perpendicular to said axis of rotation between neighboring peaks and/or valleys is at least 0.5 mm.

4. The solid state lighting module according to claim 3, wherein a peak-to-peak amplitude between said peak and said valley is at least 250 µm.

5. The solid state lighting module according to claim 1, wherein each of said peak and said valley is rounded.

6. The solid state lighting module according to claim 5, wherein each of said peak and said valley has a radius of curvature of at least 0.5 mm.

7. The solid state lighting module according to claim 1, wherein a portion of the heat spreading member facing away from the solid state light-sources is made of a metal having a hardness below 60 on the Brinell hardness scale.

8. The solid state lighting module according to claim 1, wherein the heat spreading member comprises a metal sheet arranged as a biased spring to flex in a direction towards the solid state light-sources when the heat spreading member is brought into contact with the heat sink comprised in the socket upon attachment of the solid state lighting module to the socket.

9. The solid state lighting module according to claim 8, wherein the second surface of the heat spreading member is at least partially covered with a thermal interface material.

10. The solid state lighting module according to claim 9, further comprising a liner on the second surface of the heat spreading member arranged to at least partly cover said thermal interface material for reducing friction between the heat spreading member and the heat sink comprised in the socket during attachment of said solid state lighting module to said socket.

* * * * *